(12) United States Patent
Garotta et al.

(10) Patent No.: US 6,639,871 B1
(45) Date of Patent: Oct. 28, 2003

(54) SEISMIC PROCESSING METHODS

(75) Inventors: Robert Garotta, Gonfaron (FR);
Pierre-Yves Granger, Massy (FR)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 10/111,220

(22) PCT Filed: Oct. 20, 2000

(86) PCT No.: PCT/FR00/02920

§ 371 (c)(1),
(2), (4) Date: Apr. 22, 2002

(87) PCT Pub. No.: WO01/29578

PCT Pub. Date: Apr. 26, 2001

(30) Foreign Application Priority Data

Oct. 22, 1999 (FR) .............................. 99 13197

(51) Int. Cl.⁷ .............................. G01V 1/36; G01V 1/28
(52) U.S. Cl. ...................... 367/75; 367/31; 166/250.01; 702/17
(58) Field of Search .............................. 367/31, 38, 40, 367/75; 166/250.01; 702/17, 18; 181/103

(56) References Cited

U.S. PATENT DOCUMENTS 4,635,238 A * 1/1987 Gallagher et al. ............. 367/40
5,500,832 A * 3/1996 Berryhill ..................... 367/51

* cited by examiner

Primary Examiner—Nelson Moskowitz
(74) Attorney, Agent, or Firm—Duane Morris LLP

(57) ABSTRACT

A method of processing seismic traces corresponding to two modes of propagation in the subsoil, the method being characterized by the following steps:

determining at least one pair of correlated events from the seismic traces corresponding to the two modes respectively;

determining the ratio of the differences between the vertical travel times $T_s$ and $T_p$ in the S domain and in the P domain, corresponding to said correlated pairs of events; and determining the values of $T_s$ and $T_p$ over the time interval defined by the two pairs of correlated events so that throughout said time interval, the ratio $r_t = T_s/T_p$ is equal to the ratio $V_p/V_s$ of the speeds in the P domain and in the S domain, and so that the mean value of said ratio r over said time interval corresponds to the ratio of the differences between the vertical travel times corresponding to the pairs of correlated events.

8 Claims, 2 Drawing Sheets

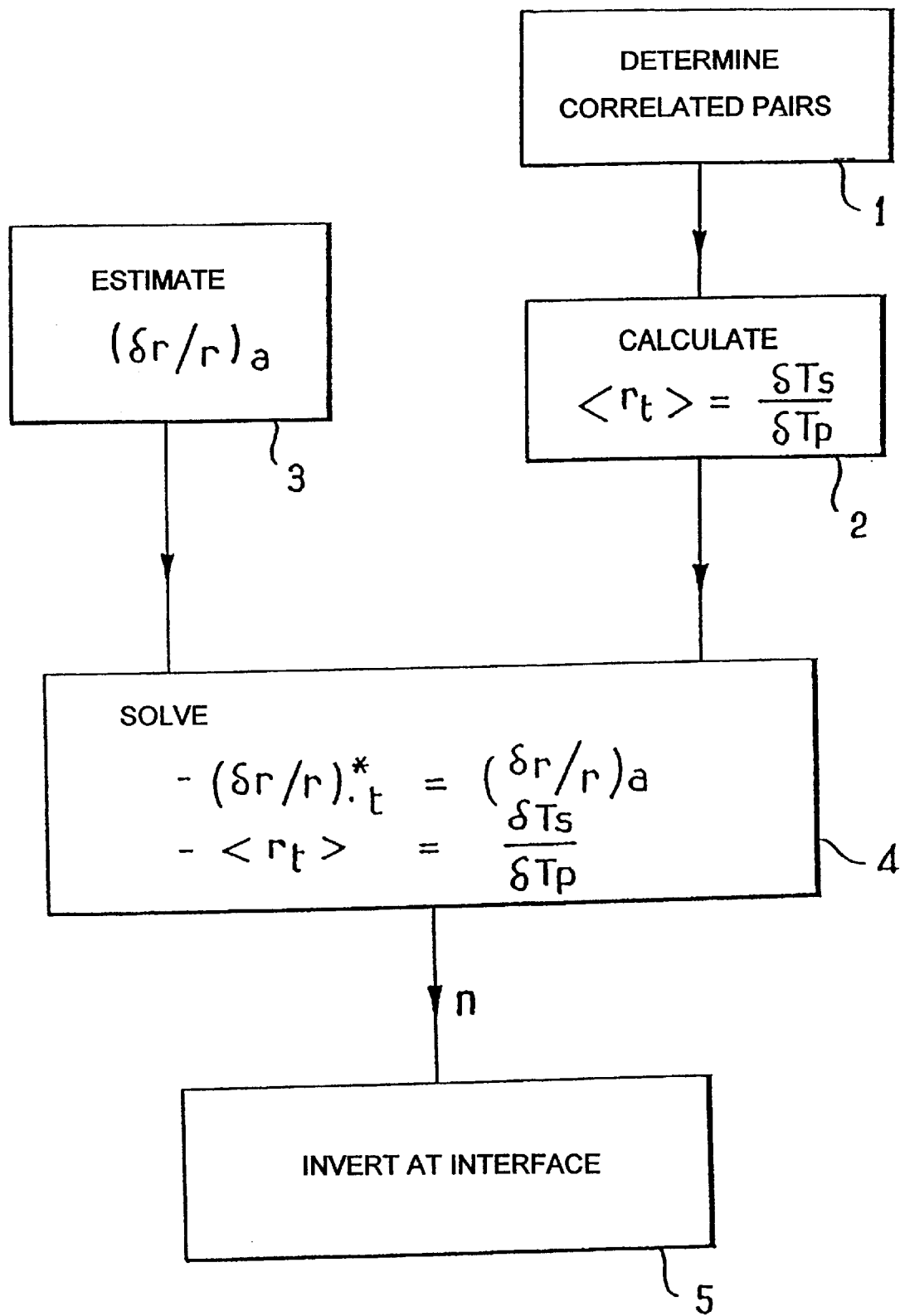
FIG_1

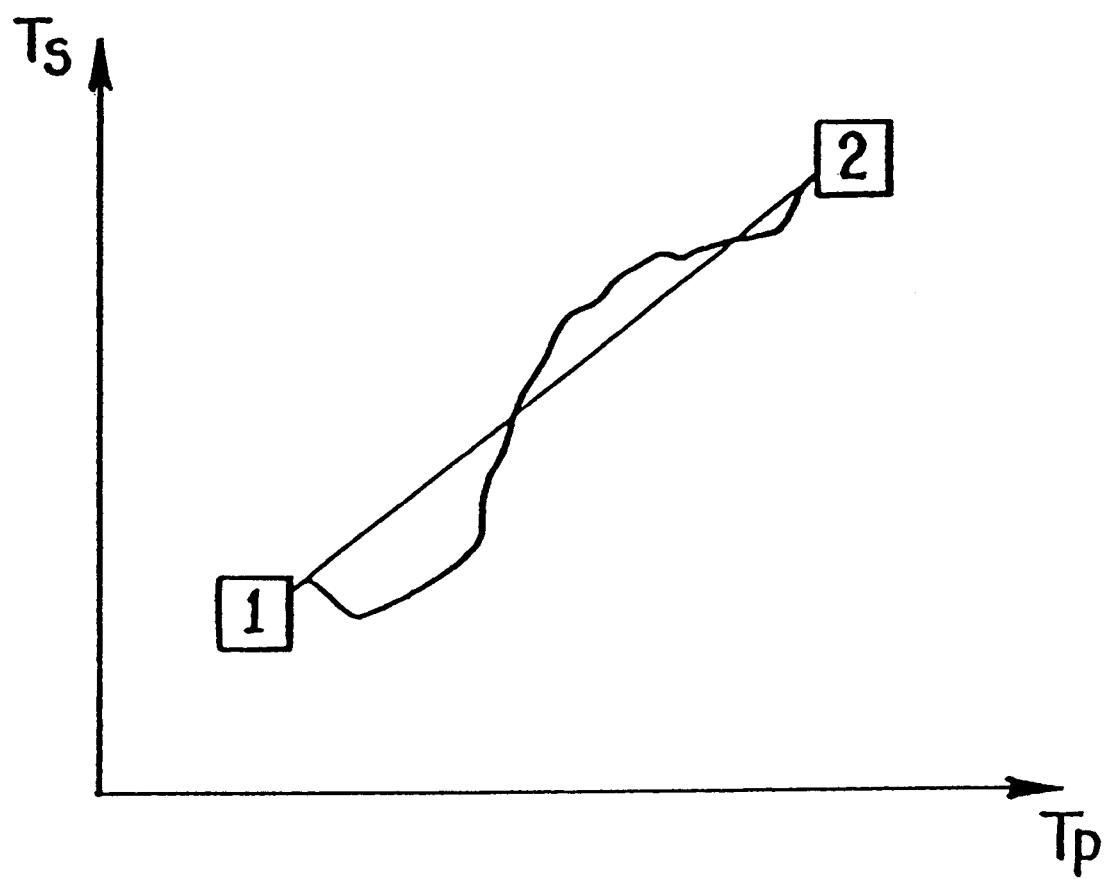
FIG_2

SEISMIC PROCESSING METHODS

The present invention relates to a seismic processing method.

The general principle of seismic prospection consists in using a seismic source to cause a disturbance in the subsoil and to use sensors to record seismic traces as generated by said disturbance so as to extract information therefrom concerning the geology of the subsoil, and in particular to detect the presence of hydrocarbons.

Two types of wave propagating through the subsoil are conventionally distinguished, namely: compression waves (so-called type P waves) which vibrate in the propagation direction; and shear waves (so-called type S waves) which vibrate perpendicularly to the propagation direction.

As a result, seismic traces picked up on the surface can correspond to a plurality of modes of propagation from the seismic disturbance. In particular, the disturbance can be a compression wave while the surface sensors record the compression components of waves reflected on various interfaces in the subsoil (P mode propagation) or the shear components thereof (converted waves—PS mode propagation). The disturbance could equally well be a shear wave, in which case the surface sensors record shear waves (S mode propagation).

Conventionally, the geological materials studied by a reflection seismic survey are characterized by their densities $\rho$ and by the propagation speeds $V_p$ and $V_s$ of the compression and shear waves. In particular, it is possible to express the reflectivity of an interface as a function of three parameters. The equations making this possible are known as Zoeppritz equations and they make use of the angle of incidence of the wave on the interface in question.

Seismic inversion consists in calculating these three parameters $\rho$, $V_p$, and $V_s$ on the basis of seismic traces recorded in a surface seismic survey.

An object of the invention is to propose a seismic processing method that makes it possible quickly and robustly to determine the various parameters $\rho$, $V_p$, and $V_s$.

To this end, the invention takes advantage of the fact that it is possible to make two independent estimates of the ratio $V_p/V_s$.

It can be estimated from the vertical paths of the S waves and of the P waves.

In this respect, reference can be made to the following article:

M. D. McCormack, et al.: "A case study of stratigraphic interpretation using shear and compressional seismic data"—Geophysics, May 1984, USA, Vol. 49, No. 5, pp. 509–520, XP002143569.

The ratio could also be estimated from the reflectivities of two (or more) wave modes reflected (or converted) at the interface in question.

The invention seeks to take advantage of these two possible ways of making an estimate. Specifically, the invention provides a method of processing seismic traces corresponding to two modes of propagation in the subsoil, the method being characterized by the following steps:

determining at least one pair of correlated events from the seismic traces corresponding to the two modes respectively;

determining the ratio of the differences between the vertical travel times $T_s$ and $T_p$ in the S domain and in the P domain, corresponding to said correlated pairs of events; and determining the values of $T_s$ and $T_p$ over the time interval defined by the two pairs of correlated events so that throughout said time interval, the ratio $r_t = T_s/T_p$ is equal to the ratio $V_p/V_s$ of the speeds in the P domain and in the S domain, and so that the mean value of said ratio r over said time interval corresponds to the ratio of the differences between the vertical travel times corresponding to the pairs of correlated events.

Such a method is advantageously associated with the various following characteristics taken singly or in any technically feasible combination:

to optimize the ratio $r_t = T_s/T_p$, over a plurality of subintervals defined by sampling times $t_i$ distributed over the time interval in question, an estimate of $\delta V_p/V_p - \delta V_s/V_s$ is determined as a function of reflectivity parameters corresponding to the two modes of propagation respectively, where $\delta V_p$ and $\delta V_s$ respectively represent the variation in speed in the P domain and in speed in the S domain over such a subinterval;

for the various sampling times $t_i$ of the time interval in question, the values of $T_s$ and $T_p$ are determined so that for each subinterval as determined by the sampling times $t_i$, the relative differential variation $\delta r_t/r_t$ is equal to the estimate of $\delta V_p/V_p - \delta V_s/V_s$ as determined for said subinterval;

for the various sampling times $t_i$ of the time interval in question, the values of $T_s$ and $T_p$ are determined so that for each subinterval as determined by said sampling times $t_i$, the relative differential variation $\delta r/r$, convoluted with the seismic wavelet, is equal to the estimate of $\delta V_p/V_p - \delta V_s/V_s$ as determined for said subinterval;

the seismic traces correspond to P and S propagation modes;

to estimate $\delta V_p/V_p - \delta V_s/V_s$, the following is calculated:

$$(\delta r/r)_a = 2[R_p(0) - R_s(0)]$$

where $R_p(0)$ and $R_s(0)$ are the P mode and S mode reflectivities at normal incidence;

the seismic traces correspond to P propagation mode and to PS propagation mode; and in order to estimate $\delta V_p/V_p - \delta V_s/V_s$, the following is calculated:

$$(\delta r/r)_a = \tfrac{1}{2}[(4+r)/R_{pp} - rG_{pp} + (2+r)G_{ps}]$$

where $R_{pp}$, $G_{pp}$, and $G_{ps}$ are P mode and PS mode reflectivity parameters.

The invention also provides a seismic prospecting method in which a disturbance is emitted into the subsoil and sensors are used to pick up seismic traces corresponding to two different propagation modes, and in which a seismic treatment method of the above-defined type is implemented to provide information about the geology of the subsoil.

Other characteristics and advantages of the invention appear further from the following description. The description is purely illustrative and non-limiting. It should be read with reference to the accompanying figures, in which:

FIG. 1 is a block diagram showing the various steps of a method constituting one possible implementation of the invention; and FIG. 2 is a graph showing the appearance of the curve $T_p$ as a function of $T_s$ and determined using one possible implementation of the invention.

In the method shown in FIG. 1, pairs of events that are correlated in the P domain and in the S domain are determined in a step 1. This is done on the basis of P domain seismic traces and of S domain seismic traces, which traces may optionally have been subjected to preprocessing.

The term "correlated event" is used to mean an event whose propagation times, respectively $T_p$ and $T_s$ are known and associated with the same reflector.

Once this determination has been done, vertical travel times $T_p$ and $T_s$ are calculated for two successive pairs of events in the P domain and the S domain, which travel times correspond to said events in the P domain and in the S domain, and then the ratio $\delta T_s/\delta T_p$ of said vertical travel time differences in the S domain and in the P domain is calculated (step 2).

$T_p$ and $T_s$ are values observed from the original data.

Successive events (n) and (n+1) are defined by:

$$T_p(n+1) < T_p(n) \text{ and } T_s(n+1) > T_s(n)$$

where T represents space-time.

In another step (step 3), optionally implemented in parallel with step 2, an estimate $(\delta r/r)_a$ of the ratio $\delta r/r$ is calculated on the basis of the amplitudes of the seismic traces and more particularly on the basis of the reflectivity parameters that can be determined from seismic traces that are available. This estimation is performed for different sampling times $t_i$ lying within the time interval between two pairs of correlated events for which an approximation of the ratio $r_t$ has been determined.

It is known that the relative differences $\delta V_p/V_p$ and $\delta V_s/V_s$ can be presented as a function of reflectivity parameters. For example, for P and S data at normal incidence ($\sigma=0$), the reflectivities $R_p$ and $R_s$ are as follows:

$$2R_p(0) = \delta V_p/V_p + \delta\rho/\rho \text{ and } 2R_s(0) = \delta V_s/V_p + \delta\rho/\rho \quad [1]$$

Consequently, the following can be written:

$$2[R_p(0) - R_s(0)] = \delta V_p/V_p - \delta V_s/V_p = (\delta r/r)_a \quad [2]$$

For each instant $t_i$ and for a given reflecting interface, equation [2] is used to determine an estimate $(\delta r/r)_a$ of the ratio $\delta r/r$, using the reflectivity parameters calculated for the data P and S.

It will be observed that the passband and the resolution of said estimate are the same as those of the seismic data.

In a following step (step 4), the data calculated in step 2 and the data calculated in step 3 are used to determine for each time interval $(t_{i-1}, t_i)$ an estimate of the ratio $r_{ti}$ (also written $r_i$ in the text below).

To this end, the value of $r_i$ is calculated as a function of the value of $r_{i-1}$, by writing:

$$r_{ti} = (t_{si} - t_{si-1})/(t_{pi} - t_{pi-1}) \quad [3]$$

and $$(\delta r/r)_{ti} = 2(r_1 - r_{i-1})(r_t - r_{i-1}) \quad [4]$$

and by putting $(\delta r/r)_t$ equal to the value $(\delta r/r)_a$ as estimated in step 3 for the instant $t_i$ in question, on the basis of the determined reflectivity parameters $R_p(0)$ and $R_s(0)$.

Nevertheless, it should be observed that this equality assumes that a common frequency band has been imposed by filtering the data in time and in amplitude.

To take account of this constraint, the seismic wavelet at $(\delta r/r)_t$ is convoluted.

The following are then resolved:

$$(\delta r/r)_a = 2[R_p(0) - R_s(0)] = (\delta r/r) \otimes_i \quad [5]$$

and $$<r_t> = \delta T_s/\delta T_p \quad [6]$$

where $<r_t>$ designates the mean of the values for $r_t$ over the time interval in question and where $\delta T_s/\delta T_p$ is the ratio calculated in step 2 for this interval.

As the reader will have understood, this corresponds to a system of n equations in n unknowns (where n is the number of samples in the time interval in question—including the correlated events at the two ends of the time interval).

In FIG. 2, curve R extends between two pairs of correlated events referenced 1 and 2 and shows the path along which equation [5] is satisfied, e.g. in the least squares sense.

This path can be determined by various optimization methods, e.g. by a Monte Carlo method.

After determining r in this way for the entire interval under consideration, an inversion step 5 is performed making it possible for the reflection interface under consideration to determine the differences relating to the speeds $V_p$ and $V_s$ and to the density $\rho$.

For an example of inversion processing, reference can be made to the following two publications:

S. Gluck, E. Juve, and Y. Lafet (1997), "High-resolution impedance layering through 3D stratigraphic inversion of postsback seismic data", The Leading Edge, pp. 1309–1315, issue of September 1997; and S. Jin (1999), "Reservoir characterization using AVO attributes from multicomponent data", SBGf RIO99 expanded abstract.

Naturally, it is possible to envisage using estimates of the ratio $\delta r/r$ based on other reflectivity parameters.

In general, any association of two different reflectivity modes can be used to write equations such as [1] and [2].

For example, adopting linearized forms of the Zoeppritz equations for simplification purposes, and by associating P mode and PS mode with propagation times $t_{pp}$ and $t_{ps}$, the following are obtained:

$$r_t = 2(t_{ps} - t_{pp}/2)/t_{pp} \quad [7]$$

$$R_{pp} = \frac{1}{2}(\delta V_p/V_p + \delta\rho/\rho) \quad [8a]$$

$$G_{pp} = \frac{1}{2}\delta V_p/V_p - (4/r^2)(\delta V_s/V_s) - (2/r^2)(\delta\rho/\rho) \quad [8b]$$

$$G_{ps} = -(2/r)(\delta V_s/V_s) - ((2+r)/r)(\delta\rho/\rho) \quad [8c]$$

where $R_{pp}$, $G_{pp}$, and $G_{ps}$ are reflectivity parameters of P mode and of PS mode.

Inverting the system [8] gives:

$$(\delta V_p/V_p - \delta V_s/V_s) = (\delta r/r)_a$$

i.e.:

$$(\delta r/r)_a = \frac{1}{2}[(4+r)/R_{pp} - rG_{pp} + (2+r)G_{ps}] \quad [9]$$

This gives an estimate of $(\delta r/r)_a$ as a function of the reflectivity parameters $R_{pp}$, $G_{pp}$, and $G_{ps}$.

What is claimed is:

1. A method of processing seismic traces corresponding to modes of propagation in the P domain and in the S domain in the subsoil, in which method:

the vertical travel times in the S domain and in the P domain of at least one correlated event in said two domains is determined from the seismic traces, the method being characterized in that:

for two such events, the ratio between firstly the difference between the vertical travel times of said two events in the S domain, and secondly the difference between the vertical travel times of said two events in the P domain is determined; and for different instants of the time interval defined between the vertical travel times of said two events in the S domain, the corresponding vertical travel times in the P domain are calculated, or for different instants of the time interval defined between the vertical travel times of said two events in the P domain, the corresponding vertical travel times in the S domain are calculated while imposing the following two constraints:

for any interval in question, the ratio $r_t = T_s/T_p$ is equal to the ratio $V_p/V_s$ of the speeds in the P domain and in the S domain; and the mean value of said ratio r over said time interval corresponds to the ratio between firstly the difference between the vertical travel times of said events in the S domain, and secondly the difference between the vertical travel times of said two events in the P domain.

2. A method according to claim 1, characterized in that over a plurality of subintervals $(t_{i-1}, t_i)$ defined by sampling times $t_i$ distributed over the time interval in question, an estimate of $\delta V_p/V_p - \delta V_s/V_s$ is determined as a function of reflectivity parameters corresponding to the two modes of propagation respectively, where $\delta V_p$ and $\delta V_s$ respectively represent the variation in speed in the P domain and in speed in the S domain over such a subinterval, and in that optimized values for the ratio $r_t = T_s/T_p$ is calculated as a function of said estimates.

3. A method according to claim 2, characterized in that for the various sampling times $t_i$ of the time interval in question, the values of $T_s$ and $T_p$ are determined so that for each subinterval, the relative differential variation $\delta r_t/r_t$ is equal to the estimate of $\delta V_p/V_p - \delta V_s/V_s$ as determined for said subinterval.

4. A method according to claim 3, characterized in that for the various sampling times $t_i$ of the time interval in question, the values of $T_s$ and $T_p$ are determined so that for each subinterval, the relative differential variation $\delta r/r$, convoluted with the seismic wavelet, is equal to the estimate of $\delta V_p/V_p - \delta V_s/V_s$ as determined for said subinterval.

5. A method according to any preceding claim, characterized in that the seismic traces correspond to P and S propagation modes.

6. A method according to claim 5, taken in combination with any one of claims 2 to 4, characterized in that to estimate $\delta V_p/V_p - \delta V_s/V_s$, the following is calculated:

$$(\delta r/r)_a = 2[R_p(0) - R_s(0)]$$

where $R_p(0)$ and $R_s(0)$ are the P mode and S mode reflectivities at normal incidence.

7. A method according to any one of claims 1 to 4, characterized in that the seismic traces correspond to P propagation mode and to PS propagation mode.

8. A method according to claim 5, taken in combination with any one of claims 2 to 4, characterized in that in order to estimate $\delta V_p/V_p - \delta V_S/V_s$, the following is calculated:

$$(\delta r/r)_a = \tfrac{1}{2}[(4+r)/R_{pp} - rG_{pp} + (2+r)G_{ps}]$$

where $R_{pp}$, $G_{pp}$, and $G_{ps}$ are P mode and PS mode reflectivity parameters.

* * * * *